(12) United States Patent
Sherman et al.

(10) Patent No.: US 7,498,008 B2
(45) Date of Patent: Mar. 3, 2009

(54) PROCESS OF GAS TREATMENT TO REMOVE POLLUTANTS

(75) Inventors: Jeffrey H. Sherman, Vero Beach, FL (US); Sagar B. Gadewar, Goleta, CA (US); Peter K. Stoimenov, Goleta, CA (US)

(73) Assignee: GRT, Inc., Santa Barbara, CA (US)

( * ) Notice: Subject to any disclaimer, the term of this patent is extended or adjusted under 35 U.S.C. 154(b) by 288 days.

(21) Appl. No.: 11/359,779

(22) Filed: Feb. 23, 2006

(65) Prior Publication Data

US 2007/0196255 A1 Aug. 23, 2007

(51) Int. Cl.
*B01D 53/50* (2006.01)
*B01D 53/52* (2006.01)
*B01D 53/64* (2006.01)

(52) U.S. Cl. .................. 423/210; 423/220; 423/224; 423/230; 423/242.1; 423/243.01; 423/243.07; 423/244.01; 423/224.02; 423/224.03; 423/224.06; 423/244.1

(58) Field of Classification Search .............. 423/210, 423/220, 224, 230, 242.1, 243.01, 243.07, 423/244.01, 244.02, 244.03, 244.06, 244.1
See application file for complete search history.

(56) References Cited

U.S. PATENT DOCUMENTS

| | | | | |
|---|---|---|---|---|
| 4,478,800 A | * | 10/1984 | van der Wal et al. | ......... 423/230 |
| 4,526,773 A | * | 7/1985 | Weber | ...................... 423/576.5 |
| 5,147,620 A | * | 9/1992 | Rozsa | ........................ 423/224 |
| 5,662,872 A | * | 9/1997 | Shimada et al. | ............. 423/236 |
| 5,698,172 A | * | 12/1997 | McManus et al. | ............ 423/220 |
| 6,638,347 B2 | * | 10/2003 | El-Shoubary et al. | ......... 96/108 |
| 6,878,358 B2 | * | 4/2005 | Vosteen et al. | ............... 423/210 |
| 2002/0119086 A1 | * | 8/2002 | Huard et al. | .................. 423/224 |
| 2006/0204418 A1 | * | 9/2006 | Chao et al. | ................... 423/210 |
| 2006/0205592 A1 | * | 9/2006 | Chao et al. | .................. 502/417 |
| 2007/0154373 A1 | * | 7/2007 | Johnson et al. | ............. 423/210 |

* cited by examiner

*Primary Examiner*—Timothy C Vanoy
(74) *Attorney, Agent, or Firm*—Arent Fox LLP

(57) ABSTRACT

A process for the removal of a pollutant from a gas is provided that includes contacting a gas comprising a pollutant with a cataloreactant wherein the cataloreactant reacts with the pollutant and wherein an oxidation state of the cataloreactant is reduced. The cataloreactant may be regenerated with an oxidizing agent.

36 Claims, 3 Drawing Sheets

PROCESS OF GAS TREATMENT TO REMOVE POLLUTANTS

FIELD OF THE INVENTION

The present invention relates to a process of gas treatment to remove pollutants and, more particularly, to a process of gas treatment to remove pollutants such as sulfur oxides, hydrogen sulfide and mercury.

BACKGROUND OF THE INVENTION

Treatment of process gases, e.g., flue gases, that include pollutants, such as, sulfur oxides, hydrogen sulfide, and mercury, is essential since these pollutants act as precursors to acid rain and photochemical smog. The content of sulfur dioxide in flue gases, for example, varies over a wide range and can be relatively low, such as 1-3%, or sometimes as high as 20%. Although the mercury content of flue gas is typically very low, given its high toxicity, environmental specifications require the complete removal of mercury. Therefore, there is a need in the art to provide a cost effective process to reduce emitted pollutants, such as, sulfur oxides, hydrogen sulfide and mercury. In addition, treatment processes must be able to effectively treat a large volume of gas to reduce contaminant levels below environmental specifications.

U.S. Pat. No. 6,737,031 provides a method of simultaneously reducing carbon dioxide emissions and sulfur dioxide emissions produced by the combustion of carbon-containing matter in a hearth. The method consists of injecting a calcium-based agent, e.g., calcium oxide, into a hearth to absorb $SO_2$, then using the fraction of the calcium-based agent that has not reacted with $SO_2$ to capture $CO_2$ by carbonization.

U.S. Pat. No. 6,534,024 discloses an exhaust gas treatment process in which exhaust gas containing mercury and sulfur dioxide is subjected to a desulfurization treatment in a desulfurizing absorption tower and then passed through a mist eliminator for removing mercury from the desulfurized exhaust.

U.S. Pat. No. 4,557,912 discloses a method of treating air-polluting waste containing sulfur dioxide by removing solid particulate matter, separating the waste industrial flue gases into high and low molecular weight fractions, in which the higher molecular weight fraction contains a greater concentration of sulfur dioxide, and oxidizing the sulfur dioxide by contacting it with oxygen and a variety of nitrogen oxides.

U.S. Pat. No. 5,976,373 relates to a process and system for the removal of hydrogen sulfide from an anaerobic digester effluent gas stream. The method comprises adding oxygen to the effluent gas stream to form an oxygen-enriched gas stream; removing particulates, including water and bacteria, from the gas stream; and removing hydrogen sulfide via the Claus reaction to form a hydrogen sulfide-free gas stream, which is suitable for use as a fuel gas source in a power plant.

U.S. Pat. No. 5,407,466 discloses a process for treating gas streams containing hydrogen sulfide, carbon dioxide, water vapor and methane using a membrane separation process.

U.S. Pat. No. 5,147,620 discloses a process for removing hydrogen sulfide from gas streams by passing the gas stream through an aqueous solution of copper (II) ions to convert the hydrogen sulfide to copper sulfide. The copper (II) ion solution is prepared by admixing powdered copper (Cu) with an aqueous solution of nitric acid. The copper (II) ion solution may be regenerated from the copper sulfide by treatment with nitric acid.

U.S. Pat. No. 6,878,358 discloses a process for removing mercury from flue gases of a furnace by feeding bromine, or a bromine compound, to the furnace or the flue gas of the furnace. The temperature during the process is at least 500 C., which causes combustion or incineration of any sulfur compounds. The flue gas is then subjected to a wet cleanup to remove mercury.

U.S. Pat. No. 6,638,347 discloses a carbon-based powder containing cupric chloride for removing mercury from a high temperature, high moisture gas stream.

WO 2000062906 describes a process to remove mercury from waste gases using oxide of metals, such as Au, Ag, Cu, Sn etc., to form an amalgam with mercury.

However, previous techniques for the reduction of pollutants from a gas are not sufficiently effective and typically have high capital and operating costs. Accordingly, there is a need in the art to provide an effective process to reduce pollutants, such as carbon dioxide, mercury, sulfur compounds, nitrogen compounds and carbon compounds, that are produced during industrial applications.

SUMMARY OF THE INVENTION

The present invention relates to a process of gas treatment to remove pollutants and, more particularly, to a process of gas treatment to remove pollutants such as sulfur oxides, hydrogen sulfide and mercury.

It is an object of the present invention to provide a process for removing pollutants such as sulfur dioxide, hydrogen sulfide and mercury, either separately or together. The process is flexible in treating flue gases that may contain low to high levels of pollutants. Thus, the present invention is applicable to numerous industrial processes, including the treatment of flue gases from coal fired power plants, metallurgical operations, industrial chemical incineration, hazardous waste incineration, and biogas or natural gas cleanup.

According to the present invention a process for the removal of a pollutant from a gas is provided that includes contacting a gas comprising a pollutant with a cataloreactant wherein the cataloreactant reacts with the pollutant and wherein an oxidation state of the cataloreactant is reduced and regenerating the cataloreactant with an oxidizing agent.

DETAILED DESCRIPTION

Figure 1:
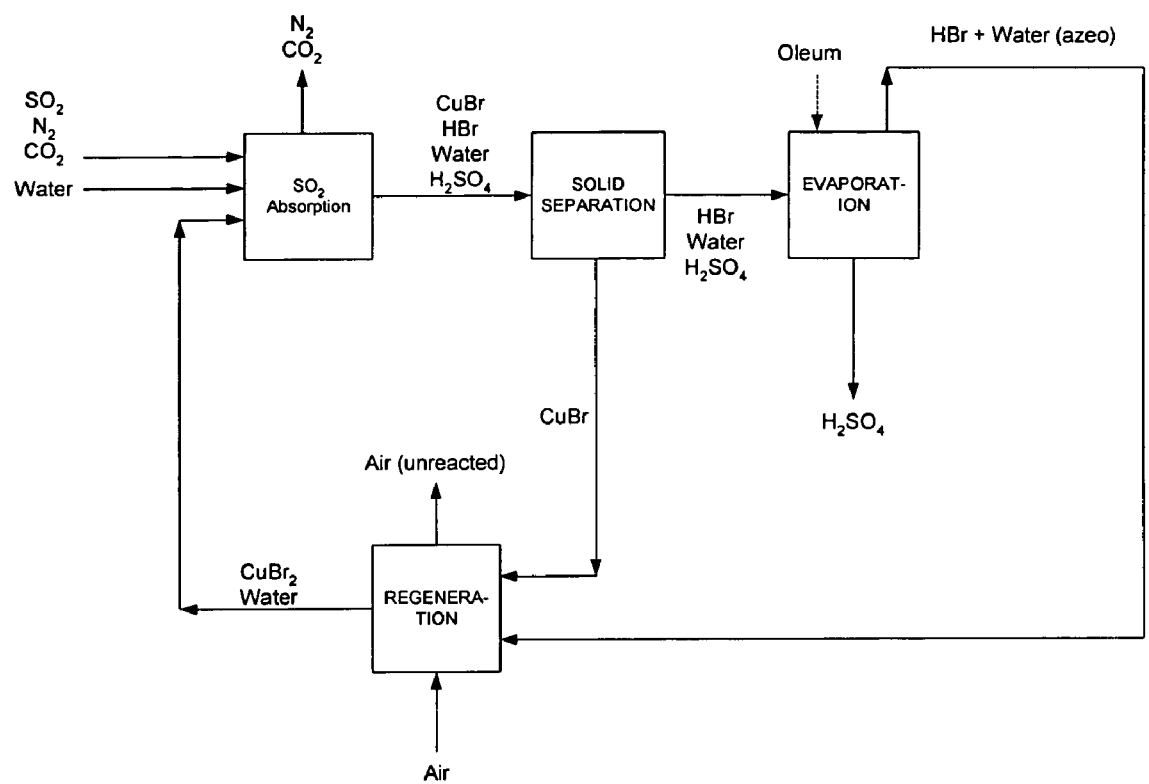
FIG. 1 shows an exemplary schematic for $SO_2$ treatment using a cataloreactant according to the process of the present invention.

The present invention relates to a process of gas treatment to remove pollutants and, more particularly, to a process of gas treatment to remove pollutants such as sulfur oxides, hydrogen sulfide and mercury. In particular, the present invention provides a novel process that utilizes one or more cataloreactants for the removal of one or more pollutants, such as sulfur oxides (e.g., sulfur dioxide), hydrogen sulfide and mercury. In some embodiments, the emission gas may also contain carbon dioxide, oxygen, nitrogen and organic components.

The process of the present invention may be used alone or in combination with other methods known in the art. For example, the process of the present invention may be used to treat the entire sulfur oxide contents of a flue gas produced from a sulfuric acid plant or supplement conventional process for the removal of pollutants from a sulfuric acid plant. Moreover, the present invention provides a process that may be used to convert an emitted pollutant, e.g., sulfur oxides and hydrogen sulfide, into a useful product, e.g., sulfuric acid, that may be recovered.

According to the present invention a process for the removal of a pollutant from a gas is provided that includes contacting a gas comprising a pollutant with a cataloreactant wherein the cataloreactant reacts with the pollutant and wherein an oxidation state of the cataloreactant is reduced and regenerating the cataloreactant with an oxidizing agent. Accordingly, the present invention provides a novel process in which a cataloreactant may be regenerated and reused within a treatment process to substantially remove pollutants.

In exemplary embodiments, the cataloreactants that may be used according to the present invention include a metal, a metal salt or combinations thereof. In other exemplary embodiments, the cataloreactants that may be used according to the present invention include a group 8 metal, a group 9 metal, a group 10 metal or salts thereof. In other exemplary embodiments, the cataloreactants that may be used according to the present invention include metals such as, but not limited to, Cu, Ag, Au, Ce, V and salts thereof. In still other exemplary embodiments, the metal salt(s) that may be used according to the present invention include metal halides (e.g., chlorides and bromides, such as but not limited to $CuBr_2$, $CuCl_2$, $FeBr_3$, $CoBr_2$), metal oxyhalides (e.g., $VO_2Br_2$) or mixtures thereof.

In exemplary embodiments, the oxidizing agent used to regenerate the cataloreactant may include, but is not limited to, oxygen or air.

In preferred embodiments, the metals and/or the metal salts may be in a homogenous solution or suspension. For example, the solution or suspension may be prepared using water or an organic solvent. In preferred embodiments, the concentration of the solution or suspension may be in the range of about 1 to about 80 wt./wt. %.

In some exemplary embodiments, metal particles may be used to increase the effectiveness of the present invention. For example, the metal particles may be used to retain mercury by forming an amalgam. The mercury may then be recovered by heating the solid precipitate.

In other preferred embodiments, performance enhancing additives may be used to enhance the reaction rate and/or dissolution of the pollutant. For example, as described below, iodine and/or surfactants may be added to enhance the process of the present invention.

In still other preferred embodiments, porous or non-porous support material may be used in the process of the present invention. In exemplary embodiments, the metal or metal salt used as a cataloreactant may be supported on, e.g., an oxide, such as $Al_2O_3$, $SiO_2$, $ZrO_2$, $TiO_2$, $WO_3$, $CaO$, $MgO$, and $Cr_2O_3$, metal carbides or nitrides (e.g., $Mo_2C$, VC, $W_2N$, TiN), glasses, carbons (e.g., glassy carbon, graphite, etc.), zeolites (e.g., ZSM-5, CaA) or clays (e.g., vermiculite, montmorillonite, hectorite).

In yet other preferred embodiments, the cataloreactant may be loaded in or on a porous material before or during use in the present invention. For example, the cataloreactant may be loaded in the porous material by impregnation, co-precipitation or chemical vapor deposition.

The porous or nonporous support does not participate in the reaction, but may be used to enhance the removal of a pollutant. For example, the process of the present invention may involve a phase transition from a solution to a solid phase, e.g., $CuBr_2$ (soln.)→CuBr (solid). When a solid is precipitated slowly from a homogenous solution it may generate large crystals with low surface area and low chemical activity. The support may provide nucleation sites that contribute to better morphology of the precipitate and enhance the reaction and regeneration. In particular, the precipitation of a solid, e.g., CuBr, on a support may be faster and generate smaller, higher surface area, particles that enhance the reaction and regeneration. In some examples, the support material may be charged opposite to that of the cataloreactant to allow co-precipitation and increase solid/liquid separation. For example, a support material with oppositely charged particles to the CuBr solid may be used to enhance the separation from the solution by mutual co-precipitation.

In some embodiments, the reaction between the cataloreactant and a pollutant may occur at ambient temperature and/or pressure. In other embodiments, the reaction between the cataloreactant and a pollutant may occur at elevated temperatures and/or pressures. In an exemplary embodiment, the reaction with the cataloreactant may be carried out at a temperature between about 1° C. to about 500° C., preferably between about 10° C. to about 80° C. In addition, the reaction between the cataloreactant and a pollutant may be carried out at any pressure. In an exemplary embodiment, the reaction with the cataloreactant may be carried out at a pressure between about 0.1 bar to about 40 bar, preferably between about 1 bar to about 10 bar. In preferred embodiments, the regeneration of the cataloreactant may be carried out at the same temperature and pressure as the reaction with the cataloreactant.

In some embodiments, the reaction and regeneration of the cataloreactant may occur in the same reactor. For example, the reaction and regeneration of the cataloreactant may be performed in a stirred tank gas-liquid-solid reactor. In other embodiments, the reaction and regeneration of the cataloreactant may occur in separate reactors that are part of the same reactor system, as shown in FIG. 1. One skilled in the art will appreciate that any conventional multiphase reactor configuration including, but not limited to, packed columns, tray columns, or bubble columns may be used to carry out the process of the present invention.

According to some embodiments of the present invention, a gas containing $SO_2$ may be treated using a cataloreactant. In a preferred embodiment, the process for the removal of $SO_2$ from a gas includes contacting the gas comprising $SO_2$ with a cataloreactant wherein the cataloreactant reacts with the $SO_2$ and wherein an oxidation state of the cataloreactant is reduced and regenerating the cataloreactant with an oxidizing agent. The sulfur oxides may be treated alone or in combination with other pollutants, such as hydrogen sulfide and mercury. Using a conventional sulfuric acid process, it is not possible to reduce the $SO_2$ content to below 100 ppm. However, according to some embodiments of the present invention, the $SO_2$ content in an emitted gas may be reduced to below 100 ppm. In other embodiments of the present invention, the $SO_2$ content in an emitted gas may be reduced to below 50 ppm.

According to the present invention, the cataloreactant may be reacted with $SO_2$ such that the oxidation state of the cataloreactant is reduced. For example, the cataloreactants of the present invention may be reacted with the $SO_2$ according to the following reaction scheme (X=Cl, Br, I; n, y=0, an integer or a fraction):

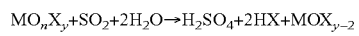

$$MO_nX_y + SO_2 + 2H_2O \rightarrow H_2SO_4 + 2HX + MOX_{y-2}$$

In further embodiments, the cataloreactant may be regenerated using an oxidizing agent, e.g., oxygen or air. For example, the cataloreactants of the present invention may be regenerated using an oxidizing agent according to the following reaction scheme (X=Cl, Br, I; n, y=0, an integer or a fraction):

$$2MO_nX_{y-2}+4HX+O_2 \rightarrow 2MO_nX_y+2H_2O$$

In preferred embodiments, the cataloreactant may further react with $SO_2$ after regeneration.

In exemplary embodiments, the cataloreactant may be copper (II) bromide. For example, an aqueous solution of copper (II) bromide may be contacted with a gas that includes $SO_2$ to produce copper (I) bromide, sulfuric acid and hydrogen bromide, as shown in the following reaction:

$$2CuBr_2+SO_2+2H_2O \rightarrow 2CuBr+H_2SO_4+2HBr$$

In some embodiments, the reaction between the cataloreactant and $SO_2$ may occur at ambient temperature and pressure. In other embodiments, the reaction between the cataloreactant and $SO_2$ may occur at elevated temperatures and/or pressures. One skilled in the art will appreciate that increasing the pressure may favor improved reaction due to increasing $SO_2$ solubility.

In preferred embodiments, the HBr produced during the reaction step may be used to regenerate the copper (II) bromide. For example, the copper (I) bromide precipitate may be oxidized using air in an aqueous solution of HBr according to the following reaction:

$$4CuBr+4HBr+O_2 \rightarrow 4CuBr_2+2H_2O$$

Figure 2:
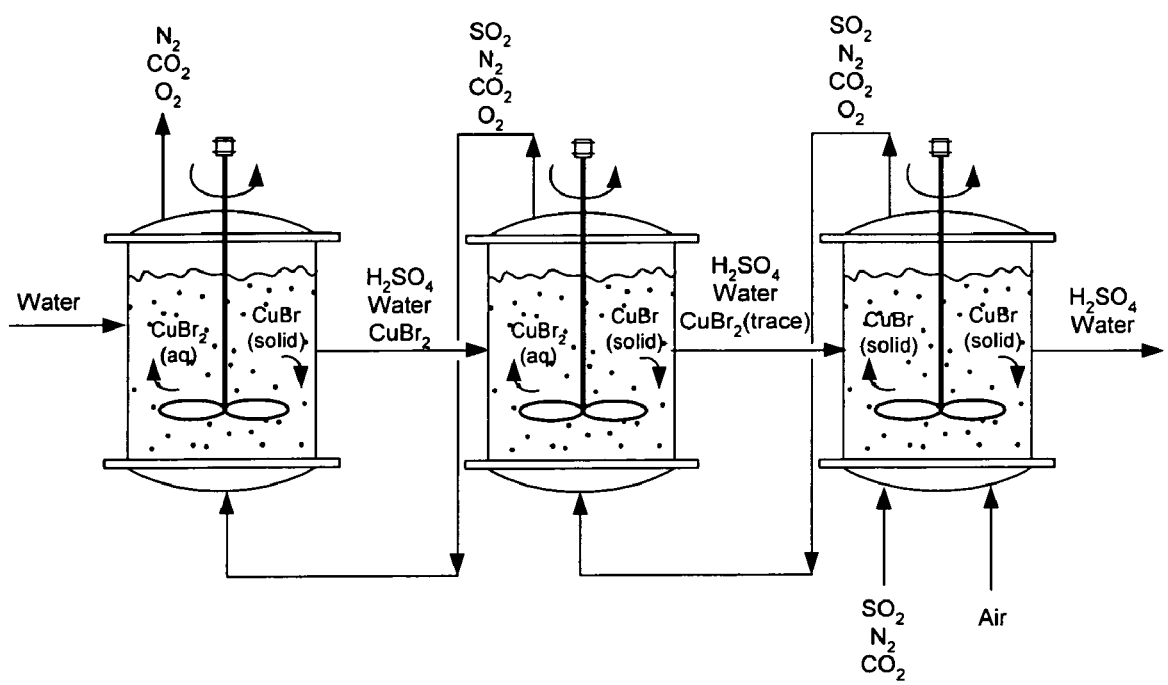
FIG. 2 shows an exemplary stirred tank reactor system for $SO_2$ treatment using a cataloreactant according to the process of the present invention.

In some embodiments, the regeneration step may be partially or completely performed in a reactor that is separate from the reactor used for the reaction step. In other embodiments, the regeneration step may be partially or completely performed in the same reactor as the reaction step, as shown in FIG. 2. In other embodiments, the regeneration step may occur at ambient temperature and/or pressure. In yet other embodiments, the regeneration may occur at elevated temperatures and/or pressures. In preferred embodiments, the regeneration of the cataloreactant may be carried out at the same temperature and pressure as the reaction with the cataloreactant.

In further embodiments, the copper (II) bromide that is regenerated may be reacted with additional $SO_2$. Thus, the process according to the present invention may involve consumption and recovery of a cataloreactant, e.g., copper bromide, to provide sulfuric acid according to the following overall reaction:

$$2SO_2+2H_2O+O_2 \rightarrow 2H_2SO_4$$

In some embodiments, the copper (I) bromide formed by reaction of the copper (II) bromide cataloreactant with $SO_2$ may be separated from the aqueous mixture as a solid precipitate. For example, filtration, centrifugal separation, hydrocyclones, or any other conventional method known in the art may be used to achieve solid-liquid separation.

In further embodiments, the aqueous solution, which contains HBr and $H_2SO_4$, may be sent to a separation system, as shown in FIG. 1. The HBr may be present in the aqueous solution as an HBr-water azeotrope, which may consist of approximately 46% HBr by weight. The HBr-water azeotrope may be separated from the $H_2SO_4$ using methods known in the art, e.g., evaporation. In preferred embodiments, the HBr-water azeotrope may be used to regenerate the copper (II) bromide. The regenerated copper (II) bromide may then be dissolved and reacted with additional $SO_2$, as shown in FIG. 1.

In further embodiments, the separated $H_2SO_4$ may be used as a sulfuric acid source. In preferred embodiments, oleum may be added to concentrate the sulfuric acid output. In another embodiment, the sulfuric acid generated using the process of the present invention may be used as a feed stream for a conventional sulfuric acid plant.

A schematic of an exemplary reactor system with multiple stirred tank reactors is shown in FIG. 2. The reactor system may consist of one or more stirred tank reactors. The gas containing $SO_2$ may be bubbled, together with air, through an aqueous solution that contains solid particles of copper (I) bromide. A counter-current flow arrangement, in which the liquid flow and the gas flow are in opposite directions, simplifies the process. Thus, the cleaned gas exits from the first reactor in the series, and an aqueous sulfuric acid stream exits the last reactor, as shown in FIG. 2. One advantage of this configuration is that there is no free HBr, thereby simplifying the separation process. One skilled in the art will appreciate that any conventional multiphase reactor configuration including, but not limited to, packed columns, tray columns, or bubble columns may be used to carry out the $SO_2$ absorption and $CuBr_2$ regeneration.

One skilled in the art with the benefit of the present disclosure will appreciate that the process of the present invention may be enhanced in several ways and remain within the scope of the present invention. For example, the process of the present invention may be enhanced by achieving faster reaction kinetics or a faster equilibrium between the $SO_2$ content in the gas and liquid phases. In an exemplary embodiment, the solubility equilibrium could be influenced by adding a small amount of a surface active agent to decrease the surface tension between the gas phase and the liquid solution phase. A surface active agent as used according to the present invention is any substance that will decrease the surface tension. Any surface active agent known in the art may be used including, but not limited to, conventional surfactants (e.g., SDS, AOT, Na-stearate, dodecylbenzenesulfonic acid, etc.) as well as solutes that decrease surface tension such as organic solvents (e.g., ethanol, ethyl ether, acetone, dodecanol, etc.) or other additives (e.g., tetrabutylammonium bromide, etc.).

According to some embodiments, the process of the present invention may be enhanced by adding $I_2$ during the reaction of the cataloreactant. For example, the addition of $I_2$ may make the reaction with $SO_2$ faster as compared to the reaction in the presence of only the cataloreactant. Thus, the absorption of $SO_2$ may be more complete and/or the throughput for a particular reactor volume may be larger by the addition of $I_2$. For example, the $I_2$ may react with $SO_2$ to form $H_2SO_4$ and HI, as shown in the following reaction:

$$SO_2+2H_2O+I_2 \rightarrow H_2SO_4+HI$$

In exemplary embodiments, the cataloreactant may be copper (II) bromide and any $Cu^+$ formed during the reaction with $SO_2$ may react with the $I^-$ generated to produce a CuI precipitate. In other embodiments, the $I^-$ may be oxidized by $Cu^{2+}$ to produce $I_2$ and a CuI precipitate. Both mechanisms of the reaction of $I^-$ are shown below:

$$Cu^++I^- \rightarrow CuI$$

$$2Cu^{2+}+4I^- \rightarrow 2CuI+I_2$$

As described above, in exemplary embodiments the reaction and regeneration of the cataloreactant may be performed with any conventional multiphase reactor configuration, such as in stirred tank gas-liquid-solid reactors. Thus, any $I_2$ formed may be recycled to further react with $SO_2$. For example, if a copper (II) bromide cataloreactant is used, the $I_2$ will be carried over with the $HBr/H_2SO_4$ to the separation unit, as shown in FIG. 2. Since $I_2$ has a low solubility in water (~300 mg/L), the 12 will be completely returned with the more volatile $HBr/H_2O$ azeotrope to further react with $SO_2$.

In other exemplary embodiments, $SO_2$ may be treated using a $FeBr_3$ cataloreactant For example, the $FeBr_3$ cataloreactant may be reacted with $SO_2$ according to the following reaction:

$$2FeBr_3+SO_2+2H_2O \rightarrow 2FeBr_2+H_2SO_4+2HBr$$

In further embodiments, the $FeBr_3$ cataloreactant may be regenerated using an oxidizing agent, e.g., oxygen or air according to the following reaction:

$$4FeBr_2+4HBr+O_2 \rightarrow FeBr_3+2H_2O$$

According to other embodiments, hydrogen sulfide may be treated using the process of the present invention. In a preferred embodiment, the process for the removal of hydrogen sulfide from a gas includes contacting the gas comprising hydrogen sulfide with a cataloreactant wherein the cataloreactant reacts with the hydrogen sulfide and wherein an oxidation state of the cataloreactant is reduced and regenerating the cataloreactant with an oxidizing agent. The hydrogen sulfide may be treated alone or in combination with other pollutants, such as sulfur oxides and mercury. For example, the present invention may be used to remove $H_2S$ from biogas or natural gas streams. According to the present invention, the cataloreactant may be reacted with $H_2S$ such that the oxidation state of the cataloreactant is reduced. For example, the cataloreactants of the present invention may be reacted with $H_2S$ according to the following reaction scheme (X=Cl, Br, I; n, y=0, an integer or a fraction):

$$MO_nX_y+(n+y/2)H_2S \rightarrow MS_{n+y/2}+yHX+nH_2O$$

In further embodiments, the cataloreactant may be regenerated using an oxidizing agent, e.g., oxygen or air. For example, the cataloreactants of the present invention may be regenerated using an oxidizing agent according to the following reaction scheme (X=Cl, Br, I; n, y=0, an integer or a fraction):

$$2MO_nX_{y-2}+4HX+O_2 \rightarrow 2\,MO_nX_y+2H_2O$$

In further embodiments, the cataloreactant may further react with $H_2S$ after regeneration. According to some embodiments of the present invention, the $H_2S$ content in an emitted gas may be reduced to below 100 ppm. In further embodiments, the $H_2S$ content in an emitted gas may be reduced to below 50 ppm.

In exemplary embodiments, the cataloreactant may be copper (II) bromide. For example, an aqueous solution of copper (II) bromide may be contacted with a gas that includes hydrogen sulfide to produce copper sulfide and hydrogen bromide according to the following reaction:

$$H_2S+CuBr_2 \rightarrow CuS+2HBr$$

In some embodiments, the reaction between the cataloreactant and hydrogen sulfide may occur at ambient temperature and/or pressure. In preferred embodiments, the reaction between the cataloreactant and hydrogen sulfide may occur at elevated temperatures and/or pressures. In preferred embodiments, the reaction between the cataloreactant and hydrogen sulfide occurs in an aqueous solution at a pH of 1 or higher.

In some embodiments, the copper sulfide precipitate may be separated from the aqueous solution, using methods known in the art. In other embodiments, the copper sulfide may be oxidized in the presence of HBr to regenerate the copper (II) bromide according to the following reaction:

$$2CuS+3O_2+4HBr \rightarrow 2CuBr_2+2SO_2+2H_2O$$

Figure 3:
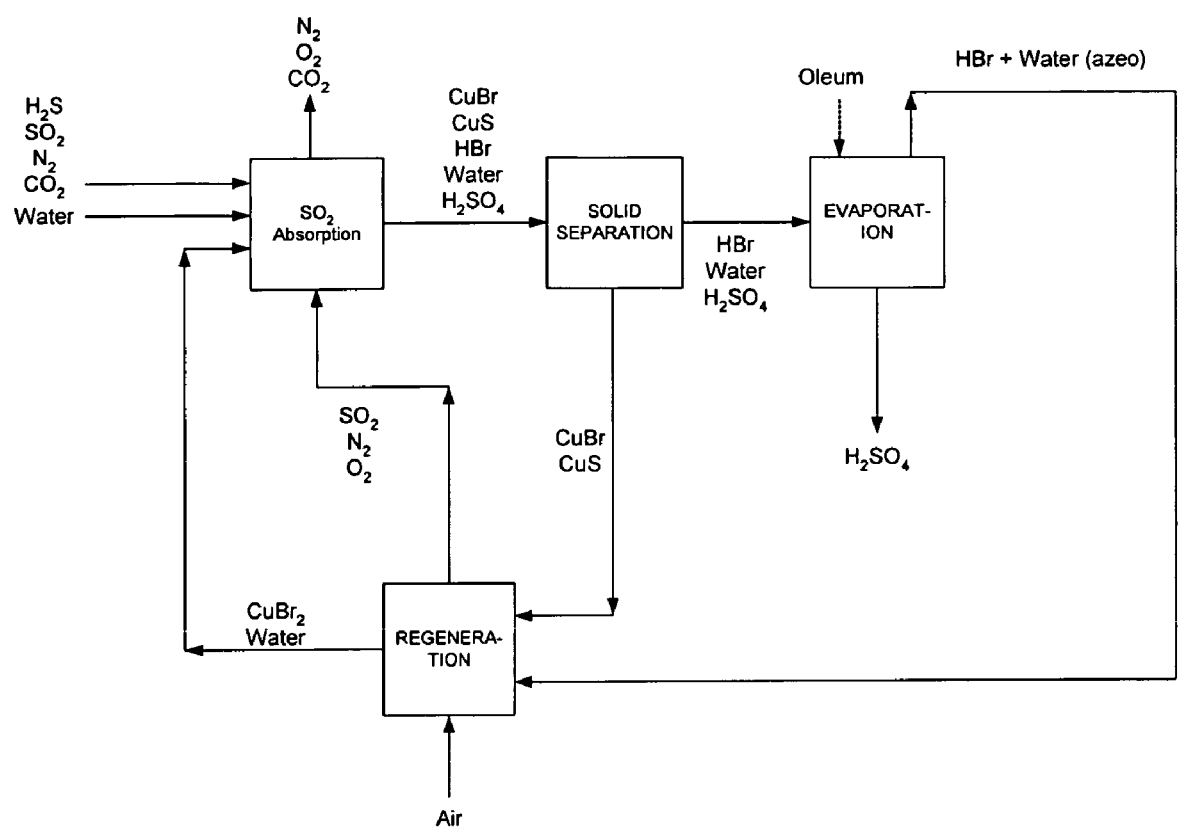
FIG. 3 shows an exemplary schematic for $H_2S$ treatment using a cataloreactant according to the process of the present invention.

In preferred embodiments, the $SO_2$ formed during regeneration may be converted to sulfuric acid using the cataloreactant. Under certain process conditions, $Cu_2S$ and/or elemental sulphur precipitates may be formed together with CuS. If $Cu_2S$ is formed it may be oxidized to regenerate $CuBr_2$ in the same way as CuS. If elemental sulphur is formed it may be periodically removed from the reactor. An exemplary process according to the present invention in which the treatment of a gas stream containing $SO_2$ and $H_2S$ is shown in FIG. 3.

In other exemplary embodiments, hydrogen sulfide may be treated using a $FeBr_3$ cataloreactant. For example, an aqueous solution of $FeBr_3$ may be reacted with hydrogen sulfide according to the following reaction:

$$2FeBr_3+3H_2S \rightarrow Fe_2S_3+6HBr$$

In further embodiments, the $FeBr_3$ cataloreactant may be regenerated using an oxidizing agent as described above.

According to other embodiments, mercury may be treated using the process of the present invention. In a preferred embodiment, the process for the removal of mercury from a gas includes contacting the gas comprising mercury with a cataloreactant wherein the cataloreactant reacts with the mercury and wherein an oxidation state of the cataloreactant is reduced and regenerating the cataloreactant with an oxidizing agent. The mercury may be present alone or in combination with other pollutants, such as sulfur oxides and hydrogen sulfide. According to the present invention, the cataloreactant may be reacted with mercury such that the oxidation state of the cataloreactant is reduced. For example, the cataloreactants of the present invention may react with the mercury according to the following reaction scheme (X=Cl, Br, I; n, y=0, an integer or a fraction):

$$MO_nX_y+Hg \rightarrow MO_nX_{y-2}+Hg_2X_2$$

In further embodiments, the cataloreactant may be regenerated using an oxidizing agent, e.g., oxygen or air. For example, the cataloreactants of the present invention may be regenerated using an oxidizing agent according to the following reaction scheme (X=Cl, Br, I; n, y=0, an integer or a fraction):

$$2MO_nX_{y-2}+4HX+O_2 \rightarrow 2MO_nX_y+2H_2O$$

In some embodiments, the cataloreactant may further react with mercury after regeneration. The process of the present invention may be used to substantially capture mercury, such that less than 1 ppm of mercury remains in an emitted gas.

In exemplary embodiments, the cataloreactant may be copper (II) bromide. For example, an aqueous solution of copper (II) bromide may be contacted with a gas that includes mercury to produce mercury bromide as a precipitate and copper (I) bromide, as shown in the following reaction:

$$2Hg+2CuBr_2 \rightarrow Hg_2Br_2+2CuBr$$

In exemplary embodiments, the copper (I) bromide may be oxidized to regenerate the copper (II) bromide cataloreactant. The $Hg_2Br_2$ precipitate, generated from the reaction of mercury with the copper (II) bromide cataloreactant, may not react under the process conditions and, therefore, may accumulate over time. Accumulated mercury bromide may then be removed from the process. Since the mercury content in a treated gas is typically very low, the loss of bromine in the precipitate should not affect the operation of the treatment process. In exemplary embodiments, HBr may be added to convert copper (I) bromide to copper (II) bromide and compensate for any bromine loss. The standard electrode potential for Hg oxidation in the presence of $Br^-$ ions is 0.139V, while the potential for $Cu^{2+}$ reduction is 0.153V. Due to a large excess of $Br^-$ and $Cu^{2+}$, the mercury bromide formation reaction will be fast and complete. Therefore, the process of the present invention may be used to completely capture mercury.

In other exemplary embodiments, mercury may be treated using a $FeBr_3$ cataloreactant. For example, $FeBr_3$ may be reacted with mercury according to the following reaction:

$$2FeBr_3 + Hg \rightarrow 2FeBr_2 + Hg_2Br_2$$

In further embodiments, the $FeBr_3$ cataloreactant may be regenerated using an oxidizing agent as described above.

The process of the present invention may be used in any industrial application to remove pollutants from, e.g., coal fired power plants, conventional sulfuric acid plant, metallurgical processing plants, chemical incinerators or biogas or natural gas.

In some embodiments, the process of the present invention may be used to clean the flue gas from a thermal power plant. Thermal power plants generate flue gases that contain sulfur dioxide, nitrogen oxides, and mercury. The EPA has set stringent requirements to limit the emissions of $SO_2$ from electric-generating facilities. Currently, about 80% of flue gas desulfurization for coal fired power plants is based on lime or limestone wet scrubbing techniques. However, these techniques may not reduce pollutants sufficiently and generates a solid waste that must be subsequently treated.

In addition, metallurgical operations, such as smelting, generate large amounts of sulfur dioxide. For example, smelters account for about 50% of $SO_2$ emissions in eastern Canada. The conventional technology used to reduce $SO_2$ emissions converts the $SO_2$ into sulfuric acid. However, conventional technology cannot reduce $SO_2$ emissions to levels that meet environmental specifications (e.g., below 100 ppm).

Incineration plants, e.g., domestic waste, hazardous waste and sewage sludge incineration plants, also produce gases that may consist of sulfur dioxide and mercury, which need to be treated before it is released to the atmosphere.

$H_2S$ is also a common component in natural gas derived from gas and oil fields, biomethane generated using anaerobic digestion and related processes. To use biomethane for power generation, for example, it is necessary to remove the $H_2S$ from the gas stream. $H_2S$ is also toxic and corrosive, thereby increasing the need for its removal. The purified biomethane or natural gas stream can be used for converting to higher hydrocarbons as disclosed in U.S. Pat. No. 6,525,230.

The present invention may be used alone, or in combination with traditional techniques to efficiently treat large quantities of a gas from any of the exemplary processes described above. Further, the present invention may be used to convert a gas containing sulfur into a useful product (sulfuric acid) to offer significant cost advantages compared to conventional technology. Thus, the present invention provides a novel process for the removal of pollutants from a gas that has worldwide applicability.

The following examples are merely illustrative of the present invention and should not be construed as limiting the scope of the invention in any way as many variations and equivalents that are encompassed by the present invention will become apparent to those skilled in the art upon reading the present disclosure.

EXAMPLES

Example 1

A solution was prepared by dissolving 8 g of $CuBr_2$ (anhydrous) in 50 ml DI water at room temperature. The starting $CuBr_2$ solution was an emerald green color. Pure $SO_2$ gas, from a lecture bottle (Aldrich), was bubbled through the aqueous $CuBr_2$ solution at a flow rate of 1.5 cm$^3$/min. A white crystalline precipitate of CuBr formed continuously, along with discoloration of the solution, as the Cu was removed as a CuBr precipitate. The reaction was conducted at room temperature and atmospheric pressure. The $SO_2$ was reacted until the solution became colorless (i.e., complete $CuBr_2$ consumption). The $CuBr_2$ was then regenerated by oxidizing the CuBr precipitate. In particular, 1 g of the CuBr precipitate was suspended in a solution of 2 ml HBr (48%) and 20 ml DI water. The solution was purged with oxygen at a flow rate of 1 cm$^3$/min for 8 hours, at room temperature and atmospheric pressure. A complete transfer of the insoluble CuBr to the water soluble $CuBr_2$ occurred within 6 hours.

Example 2

Using the process of the present invention, a flue gas stream generated by a copper smelting process may be treated using a process scheme similar to that depicted in FIG. 3. The flue gas stream has a flow rate of 100,000 m$^3$/hr and contained nitrogen, carbon dioxide and oxygen, with mole fractions of 0.9, 0.08, and 0.12, respectively. The flue gas also contains 1000 ppm $SO_2$ and 100 ppm $H_2S$. The mercury content of the gas is 2 g/hr.

The reaction of $SO_2$ is carried out in a 10 m$^3$ reactor at 25° C. and 5 bar using an aqueous solution of 30% by weight $CuBr_2$. Regeneration of the cataloreactant is carried out at 25° C. and 5 bar, in a reactor with a volume of 8 m$^3$. The air flow rate in the regeneration reactor is 1000 m$^3$/hr. The $SO_2$ content in the treated gas outlet was reduced to approximately 100 ppm, and the $H_2S$ content in the treated gas was reduced to 10 ppm. The process generated 400 kg/hr of sulfuric acid. Mercury was removed to below the detection limits, and the accumulation of mercury bromide was 11 kg over a period of six months.

Example 3

Using the process of the present invention, a biogas stream with a flow rate of 30,000 m$^3$/day and containing 60% methane, 39% carbon dioxide and 1% hydrogen sulfide was treated. The biogas stream is bubbled into an aqueous solution containing 30% by weight copper (II) bromide at ambient temperature and atmospheric pressure. Using a process scheme similar to that depicted in FIG. 3, the hydrogen sulfide present in the biogas is converted to a copper sulfide precipitate in an absorption reactor with a volume of 6 m$^3$. Copper (I) bromide is also formed as a precipitate and removed from the aqueous mixture together with copper sulfide using a hydrocyclone. The solids were transferred to a 5 m$^3$ regeneration reactor and copper (II) bromide is regenerated by bubbling air into the aqueous slurry. The regeneration is performed at ambient temperature and pressure. Sulfur dioxide formed during regeneration is recycled into the $SO_2$ absorption reactor. The outlet gas from the absorption reactor consisted of methane, carbon dioxide and had a hydrogen sulfide content of less than 50 ppm. The $SO_2$ content of the outlet gas was also below 50 ppm.

While the invention has been depicted and described by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalence in all respects. All references cited herein are hereby incorporated by reference in their entirety.

We claim:

1. A process for the removal of a pollutant from a gas comprising:
    (a) contacting the gas comprising the pollutant with a cataloreactant wherein the cataloreactant reacts with the pollutant and wherein an oxidation state of the cataloreactant is reduced; and
    (b) regenerating the cataloreactant with an oxidizing agent and in the presence of a hydrogen halide.

2. The process of claim 1 wherein the pollutant is selected from the group consisting of sulfur oxides and mercury.

3. The process of claim 1 wherein the cataloreactant comprises a metal, a metal salt or a mixture thereof.

4. The process of claim 1 wherein the cataloreactant comprises a metal halide or mixtures thereof.

5. The process of claim 1 wherein the cataloreactant comprises a metal oxyhalide.

6. The process of claim 1 wherein the cataloreactant comprises a group 8 metal, a group 9 metal, a group 10 metal or salts thereof.

7. The process of claim 1 wherein the cataloreactant comprises Cu, Ag, Au, Ce, V or salts thereof.

8. The process of claim 1 wherein the cataloreactant is selected from the group consisting of $CuBr_2$, $FeBr_3$, $CoBr_2$, $VO_2Br$, and $VOBr_3$.

9. The process of claim 1 further comprising adding a performance enhancing additive or mixture thereof.

10. The process of claim 9 wherein the performance enhancing additive is iodine.

11. The process of claim 9 wherein the performance enhancing additive is a surfactant.

12. The process of claim 9 wherein the performance enhancing additive is a support material.

13. The process of claim 1 wherein the cataloreactant is provided on or in a support material.

14. The process of claim 13 wherein the support material comprises an oxide, a carbide, a nitride, a carbon, a zeolite or a clay.

15. The process of claim 14 wherein the oxide is selected from the group consisting of $Al_2O_3$, $SiO_2$, $ZrO_2$, $TiO_2$, $WO_3$, $CaO$, $MgO$ and $Cr_2O_3$.

16. A process for the removal of a pollutant from a gas comprising:
    (a) passing a gas comprising a pollutant through a reactor wherein the reactor comprises a cataloreactant dissolved in a solution and wherein the cataloreactant reacts with the pollutant and wherein an oxidation state of the cataloreactant is reduced; and
    (b) passing an oxidizing agent through the reactor in the presence of a hydrogen halide, wherein the oxidizing agent regenerates the cataloreactant.

17. The process of claim 16 further comprising adjusting the amount of oxidizing agent passed through the reactor such that the amount of the cataloreactant that is regenerated is substantially equal to the amount of the cataloreactant that is reduced.

18. The process of claim 16 wherein the pollutant is selected from the group consisting of sulfur oxides and mercury.

19. The process of claim 16 wherein the cataloreactant comprises a metal, a metal salt or a mixture thereof.

20. The process of claim 16 wherein the cataloreactant comprises a metal halide or mixtures thereof.

21. The process of claim 16 wherein the cataloreactant comprises a metal oxyhalide.

22. The process of claim 16 wherein the cataloreactant comprises a group 8 metal, a group 9 metal, a group 10 metal or salts thereof.

23. The process of claim 16 wherein the cataloreactant comprises Cu, Ag, Au, Ce, V or salts thereof.

24. The process of claim 16 wherein the cataloreactant is selected from the group consisting of $CuBr_2$, $FeBr_3$, $CoBr_2$, $VO_2Br$ and $VOBr_3$.

25. A process for the removal of a pollutant from a gas comprising:
    (a) passing a gas comprising a pollutant through a reactor wherein the reactor comprises a cataloreactant dissolved in a solution wherein the cataloreactant reacts with the pollutant and wherein a cataloreactant precipitate is formed and wherein an oxidation state of the cataloreactant precipitate is reduced compared to an oxidation state of the cataloreactant;
    (b) removing the cataloreactant precipitate from the reactor; and
    (c) oxidizing the cataloreactant precipitate in the presence of a hydrogen halide to form a regenerated cataloreactant.

26. The process of claim 25 further comprising adding the regenerated cataloreactant to the reactor.

27. The process of claim 25 wherein the pollutant is selected from the group consisting of sulfur oxides and mercury.

28. The process of claim 25 wherein the cataloreactant comprises a metal, a metal salt or a mixture thereof.

29. The process of claim 25 wherein the cataloreactant comprises a metal halide or mixtures thereof.

30. The process of claim 25 wherein the cataloreactant comprises a metal oxyhalide.

31. The process of claim 25 wherein the cataloreactant comprises a group 8 metal, a group 9 metal, a group 10 metal or salts thereof.

32. The process of claim 25 wherein the cataloreactant comprises Cu, Ag, Au, Ce, V or salts thereof.

33. The process of claim 25 wherein the cataloreactant is selected from the group consisting of $CuBr_2$, $FeBr_3$, $CoBr_2$, $VO_2Br$, and $VOBr_3$.

34. A process for the removal of hydrogen sulfide from a gas comprising:
    (a) contacting the gas comprising hydrogen sulfide with a cataloreactant wherein the cataloreactant reacts with the hydrogen sulfide; and
    (b) regenerating the cataloreactant with an oxidizing agent in the presence of a hydrogen halide.

35. A process for the removal of hydrogen sulfide from a gas comprising:
    (a) passing a gas comprising hydrogen sulfide through a reactor wherein the reactor comprises a cataloreactant dissolved in a solution; and
    (b) passing an oxidizing agent through the reactor, in the presence of a hydrogen halide, wherein the oxidizing agent regenerates the cataloreactant.

36. A process for the removal of hydrogen sulfide from a gas comprising:
    (a) passing a gas comprising hydrogen sulfide through a reactor wherein the reactor comprises a cataloreactant dissolved in a solution wherein the cataloreactant reacts with the hydrogen sulfide and wherein a cataloreactant precipitate is formed;

(b) removing the cataloreactant precipitate from the reactor; and (c) oxidizing the cataloreactant precipitate in the presence of a hydrogen halide to form a regenerated cataloreactant.

* * * * *